US008341171B2

United States Patent
Jung et al.

(10) Patent No.: US 8,341,171 B2
(45) Date of Patent: *Dec. 25, 2012

(54) NAMED ENTITY DATABASE OR MINING RULE DATABASE UPDATE APPARATUS AND METHOD USING NAMED ENTITY DATABASE AND MINING RULE MERGED ONTOLOGY SCHEMA

(75) Inventors: Han Min Jung, Daejeon (KR); Pyung Kim, Daejeon (KR); Seung Woo Lee, Daejeon (KR); Mi Kyung Lee, Daejeon (KR); Dong Min Seo, Cheongju-si (KR); Won Kyung Sung, Daejeon (KR)

(73) Assignee: Korea Institute of Science and Technology Information, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/477,263

(22) Filed: May 22, 2012

(65) Prior Publication Data

US 2012/0233214 A1 Sep. 13, 2012

Related U.S. Application Data

(62) Division of application No. 13/152,915, filed on Jun. 3, 2011, now Pat. No. 8,209,346.

(30) Foreign Application Priority Data

Jun. 25, 2010 (KR) .......................... 10-2010-0060280

(51) Int. Cl.
*G06F 17/30* (2006.01)
*G06F 7/00* (2006.01)

(52) U.S. Cl. ........................................ 707/758; 707/755

(58) Field of Classification Search ........................ None
See application file for complete search history.

(56) References Cited

U.S. PATENT DOCUMENTS 6,654,731 B1    11/2003    Mahesh
(Continued)

FOREIGN PATENT DOCUMENTS

KR    10-2005-0046973 A    5/2005
(Continued)

OTHER PUBLICATIONS

Tao Jiang et al., "Mining Generalized Associations of Semantic Relations from Textual Web Content", IEEE Transactions on Knowledge and Data Engineering, IEEE Service Center, Los Alamitos, CA, US, vol. 19, No. 2, Feb. 1, 2007, pp. 164-179, XP011152466.

(Continued)

*Primary Examiner* — Kuen Lu
(74) *Attorney, Agent, or Firm* — LRK Patent Law Firm

(57) ABSTRACT

A mining rule database update apparatus using a named entity dictionary and a mining rule combined with an ontology schema includes: a named entity dictionary and mining rule database storage module storing the named entity dictionary and a mining rule database; a named entity and mining rule search module searching for a corresponding mining rule and a named entity from the mining rule database and the named entity dictionary using a terminology included in an inputted mining pattern and the mining pattern; and a mining rule database update module estimating a relationship name using a named entity of the terminology and the ontology schema, generating a corresponding mining rule, and storing the generated mining rule in the mining rule database depending on user's selection.

10 Claims, 6 Drawing Sheets

U.S. PATENT DOCUMENTS

| | | | |
|---|---|---|---|
| 8,041,733 B2 * | 10/2011 | Rouhani-Kalleh | 707/771 |
| 2004/0148170 A1 * | 7/2004 | Acero et al. | 704/257 |
| 2010/0036788 A1 * | 2/2010 | Wu et al. | 706/47 |

FOREIGN PATENT DOCUMENTS

| | | | |
|---|---|---|---|
| KR | 10-0525072 B1 | 10/2005 |
| KR | 10-2008-0019439 A | 3/2008 |
| KR | 10-0820746 B1 | 4/2008 |

OTHER PUBLICATIONS

Horacio Saggion et al., "Ontology-Based Information Extraction for Business Intelligence", Nov. 11, 2007, The Semantic Web; [Lecture Notes in Computer Science], Springer Berlin Heidelberg, Berlin, Heidelberg, pp. 843-856, XP019136925.

European Search Report for European Patent Application No. 11169601.9 which corresponds to U.S. Appl. No. 13/152,915.

* cited by examiner

NAMED ENTITY DATABASE OR MINING RULE DATABASE UPDATE APPARATUS AND METHOD USING NAMED ENTITY DATABASE AND MINING RULE MERGED ONTOLOGY SCHEMA

CROSS REFERENCE TO RELATED APPLICATION

This application is a division of U.S. patent application Ser. No. 13/152,915, filed on Jun. 3, 2011, the disclosure of which is incorporated by reference in its entirety for all purposes.

BACKGROUND

1. Field

The present invention relates to an apparatus and method for updating a named entity dictionary or a mining rule database using the named entity dictionary and a mining rule combined with an ontology schema, in which the named entity dictionary or the mining rule database is updated by searching for a named entity or a mining rule combined with the ontology schema using the entity dictionary and the mining rule database stored in advance, estimating a named entity using the mining rule if a matching named entity is not searched, and estimating a mining rule using the named entity if a mining rule is not searched.

2. Description of the Related Art

Recently, data models using ontology are spotlighted in relation to studies on semantic webs. The ontology is a working model of entities and interactions existing in a specific domain. That is, the ontology conceptualizes and specifies knowledge in the specific domain and can be defined as a network or a graph having a relationship among the concepts used in the domain.

The ontology is constructed by obtaining knowledge related to constitutional elements of the ontology to be constructed in the ontology, such as concepts, attributes of the concepts, and connection relations among the concepts, from documents related to a specific field, defining concepts and attributes, and setting relations among the concepts.

In addition, in order to give meanings to web resources, the ontology can be expressed as a resource description framework (RDF) which is a 3-dimensional structure of resource, attribute, and attribute value.

The RDF is constructed as a concept of resource, property, and statement. All things of an inputted document are expressed as resources, and the RDF can express properties of each resource and relations of the resource with the other resources.

An RDF network can be constructed by detecting named entities from the inputted document and converting the named entities into corresponding RDF triples using mining rules.

The named entity is a word or a set of words that can be classified, such as a name of a person or an organization, a title of music, a name of broadcasting, or a name of a place, and the mining rule is configured with a mining pattern and an RDF triple that can be obtained from the mining pattern.

Detection of a named entity is a field of study that is very important in a knowledge learning field, particularly related to a voice language, and a lot of algorithms are proposed for detection of named entities.

A method based on a dictionary is the most fundamental method for detecting named entities, in which a named entity is detected by extracting a word or a set of words determined as a named entity from the inputted sentence and comparing the extracted word or set of words with a named entity stored in a previously stored named entity dictionary.

In addition, a method of converting a named entity into an RDF triple using a mining rule is a method of searching for a matching mining pattern from a previously stored mining rule database and converting the mining rule into a corresponding RDF triple.

However, the named entities or the mining rules are not fixed along a time axis, but have a characteristic of being newly generated according to a society, culture, or the like and disappeared with time, and thus the named entities and the mining rules need to be updated.

SUMMARY

The present invention relates to an apparatus and method for updating a named entity dictionary or a mining rule database using the named entity dictionary and a mining rule combined with an ontology schema, and a recoding medium which can be read by an electronic device that has recorded the method, in which the named entity dictionary and the mining rule database are updated using terminologies and mining patterns recognized from an inputted document.

To accomplish the above object, according to one aspect of the present invention, there is provided a named entity dictionary update apparatus using a named entity dictionary and a mining rule combined with an ontology schema, the apparatus comprising: a named entity dictionary and mining rule database storage module for storing the named entity dictionary where a named entity of a terminology combined with the ontology schema and connected to a concept (class) is defined and a mining rule database where the mining rule configured with an RDF triple and a mining pattern combined with the ontology schema and connected to a relationship name is defined; a mining pattern generation module for recognizing a terminology from a text and converting the terminology into the mining pattern; a named entity and mining rule search module for searching for a corresponding named entity and a mining rule from the named entity dictionary and the mining rule database using the recognized terminology and the mining pattern; and a named entity dictionary update module for estimating a named entity of the terminology using the mining rule and storing the estimated named entity of the terminology in the named entity dictionary depending on a user's selection, if a named entity corresponding to the recognized terminology is not searched from the named entity dictionary and a mining rule corresponding to the mining pattern is searched from the mining rule database.

According to another aspect of the present invention, there is provided a named entity dictionary update apparatus using a named entity dictionary and a mining rule combined with an ontology schema, the apparatus comprising: a named entity dictionary and mining rule database storage module for storing the named entity dictionary where a named entity of a terminology combined with the ontology schema and connected to a concept (class) is defined and a mining rule database where the mining rule configured with an RDF triple and a mining pattern combined with the ontology schema and connected to a relationship name is defined; a named entity and mining rule search module for searching for a corresponding mining rule and a named entity from the mining rule database and the named entity dictionary using a terminology included in an inputted mining pattern and the mining pattern; and a named entity dictionary update module for estimating a named entity of the terminology using the mining rule and storing the estimated named entity of the terminology in the named entity dictionary depending on a user's selection, if a named entity corresponding to the terminology is not searched from the named entity dictionary and a mining rule corresponding to the mining pattern is searched from the mining rule database.

The named entity dictionary update module may be connected to a verification interface for displaying properties of a named entity corresponding to the terminology, confirm the properties of the named entity corresponding to the terminology by a user through the verification interface, and then store a result of the confirmation in the named entity dictionary.

The named entity and mining rule search module may include: a named entity search unit for searching for the named entity of the terminology from the named entity dictionary; and a mining rule search unit for searching for the mining rule corresponding to the mining pattern from the mining rule database.

The named entity dictionary update module may include: a search result determination unit for determining whether or not the terminology is searched from the named entity dictionary as a result of the search; a named entity dictionary update unit for estimating the named entity of the terminology using the mining rule and storing the estimated named entity in the named entity dictionary depending on a user's selection, if the terminology is not searched from the named entity dictionary and the mining pattern is searched from the mining rule database as a result of the determination; and a control unit for controlling the named entity dictionary update unit to define and store properties of the named entity depending on a result of the determination of the search result determination unit.

The named entity dictionary update unit may define the properties of the named entity to include authority data comprising a named entity corresponding to a concept (class) of the ontology schema, a terminology classified as the named entity, identification of the terminology, a representative terminology, and identification of the representative terminology, and connect and store the properties of the named entity in one format.

The named entity dictionary may connect and store authority data comprising a named entity corresponding to a concept (class) of the ontology schema, a terminology classified as the named entity, identification of the terminology, a representative terminology, and identification of the representative terminology in one format.

The mining pattern generation module may include: a named entity recognition unit for recognizing the terminology from the text using lexical analysis, syntactic analysis, and semantic analysis in association with the named entity dictionary and expressing the recognized terminology as a named entity corresponding to a terminology stored in the named entity dictionary; and a mining pattern conversion unit for converting the text including the named entity into a mining pattern.

According to still another aspect of the present invention, there is provided a mining rule database update apparatus using a named entity dictionary and a mining rule combined with an ontology schema, the apparatus comprising: a named entity dictionary and mining rule database storage module for storing the named entity dictionary where a named entity of a terminology combined with the ontology schema and connected to a concept (class) is defined and a mining rule database where the mining rule configured with an RDF triple and a mining pattern combined with the ontology schema and connected to a relationship name is defined; a mining pattern generation module for recognizing a terminology from a text and converting the terminology into the mining pattern; a named entity and mining rule search module for searching for a corresponding named entity and a mining rule from the named entity dictionary and the mining rule database using the recognized terminology and the mining pattern; and a mining rule database update module for estimating a relationship name using a named entity of the recognized terminology and the ontology schema, generating a corresponding mining rule, and then storing the generated mining rule in the mining rule database depending on a user's selection, if a mining rule corresponding to the mining pattern is not searched from the mining rule database and the named entity corresponding to the recognized terminology is searched from the named entity dictionary.

According to still another aspect of the present invention, there is provided a mining rule database update apparatus using a named entity dictionary and a mining rule combined with an ontology schema, the apparatus comprising: a named entity dictionary and mining rule database storage module for storing the named entity dictionary where a named entity of a terminology combined with the ontology schema and connected to a concept (class) is defined and a mining rule database where the mining rule configured with an RDF triple and a mining pattern combined with the ontology schema and connected to a relationship name is defined; a named entity and mining rule search module for searching for a corresponding mining rule and a named entity from the mining rule database and the named entity dictionary using a terminology included in an inputted mining pattern and the mining pattern; and a mining rule database update module for estimating a relationship name using a named entity of the terminology and the ontology schema, generating a corresponding mining rule, and then storing the generated mining rule in the mining rule database depending on a user's selection, if a mining rule corresponding to the mining pattern is not searched from the mining rule database and the named entity corresponding to the terminology is searched from the named entity.

The mining rule database update module may be connected to a verification interface for displaying a mining rule corresponding to the mining pattern, confirm the mining rule corresponding to the mining pattern by a user through the verification interface, and then store a result of the confirmation in the mining rule database.

The named entity and mining rule search module may include: a named entity search unit for searching for the named entity of the terminology from the named entity dictionary; and a mining rule search unit for searching for the mining rule corresponding to the mining pattern from the mining rule database.

The mining rule database update module may include: a search result determination unit for determining whether or not the mining pattern is searched from the mining rule database as a result of the search; a mining rule database update unit for estimating a relationship name using the searched named entity and the ontology schema, generating a mining rule corresponding to the relationship name, and then storing the generated mining rule in the mining rule database depending on a user's selection, if the mining pattern is not searched and the terminology is searched from the named entity dictionary as a result of the determination; and a control unit for controlling the mining rule database update unit to define and store the mining rule depending on a result of the determination of the search result determination unit.

The mining rule database update unit may define the mining rule to include a relationship name (property) of the ontology schema, a mining pattern corresponding to the relationship name, and one or more RDF triples corresponding to the mining pattern, and connect and store the mining rule in one format.

The mining pattern generation module may include: a named entity recognition unit for recognizing the terminology from the text using lexical analysis, syntactic analysis, and semantic analysis in association with the named entity dictionary and expressing the recognized terminology as a named entity corresponding to a terminology stored in the named entity dictionary; and a mining pattern conversion unit for converting the text including the named entity into a mining pattern.

According to still another aspect of the present invention, there is provided a named entity dictionary update method using a named entity dictionary and a mining rule combined with an ontology schema, in an apparatus comprising a storage module for storing a named entity dictionary where a named entity of a terminology combined with the previously stored ontology schema and connected to a concept (class) is defined and a mining rule database where a mining rule configured with an RDF triple and a mining pattern combined with the ontology schema and connected to a relationship name is defined, a mining pattern generation module, a named entity and mining rule search module, and a named entity dictionary update module, the method comprising the steps of: recognizing a terminology from a text and converting the terminology into the mining pattern, by the mining pattern generation module; searching for a corresponding named entity and a mining rule from the named entity dictionary and the mining rule database using the recognized terminology and the mining pattern, by the named entity and mining rule search module; determining whether or not a terminology or a mining pattern corresponding to the recognized terminology or the mining pattern is searched from a result of the search, by the named entity dictionary update module; if a matching mining pattern is searched from the mining rule database and a matching terminology is not searched from the named entity dictionary as a result of the determination, estimating a named entity of the terminology using the mining rule corresponding to the mining pattern and the ontology schema, by the named entity dictionary update module; and storing the estimated named entity in the named entity dictionary depending on a user's selection, by the named entity dictionary update module.

In the step of storing the estimated named entity in the named entity dictionary depending on a user's selection, the recognized terminology and the estimated named entity can be displayed on a verification interface and verified by a user.

The named entity dictionary may connect and store authority data comprising a named entity corresponding to a concept (class) of the ontology schema, a terminology classified as the named entity, identification of the terminology, a representative terminology, and identification of the representative terminology in one format.

The step of recognizing a terminology from a text and converting the terminology into the mining pattern may include the steps of: recognizing the terminology from the text using lexical analysis, syntactic analysis, and semantic analysis in association with the named entity dictionary and expressing the recognized terminology as a named entity corresponding to a terminology stored in the named entity dictionary; and converting the text including the named entity into a mining pattern.

According to still another aspect of the present invention, there is provided a recording medium that can be read by an electronic device, for recording a program for executing the named entity dictionary update method using a named entity dictionary and a mining rule combined with an ontology schema.

According to still another aspect of the present invention, there is provided a named entity dictionary update method using a named entity dictionary and a mining rule combined with an ontology schema, in an apparatus comprising a storage module for storing a named entity dictionary where a named entity of a terminology combined with the stored ontology schema and connected to a concept (class) is defined and a mining rule database where a mining rule configured with an RDF triple and a mining pattern combined with the ontology schema and connected to a relationship name is defined, a mining pattern generation module, a named entity and mining rule search module, and a named entity dictionary update module, the method comprising the steps of: recognizing a terminology from a text and converting the terminology into the mining pattern, by the mining pattern generation module; searching for a corresponding named entity and a mining rule from the named entity dictionary and the mining rule database using the recognized terminology and the mining pattern, by the named entity and mining rule search module; determining whether or not a terminology or a mining pattern corresponding to the recognized terminology or the mining pattern is searched, from a result of the search, by the mining rule database update module; if a matching terminology is searched from the named entity dictionary and a matching mining pattern is not searched from the mining rule database as a result of the determination, estimating a relationship name using the named entity of the terminology and the ontology schema and generating a corresponding mining rule, by the mining rule database update module; and storing the estimated relationship name and the mining rule in the mining rule database depending on a user's selection, by the mining rule database update module.

In the step of storing the estimated relationship name and the mining rule in the mining rule database depending on a user's selection, the estimated relationship name, the mining pattern, and the mining rule can be displayed on a verification interface and verified by a user.

The mining rule database may define a mining rule to include a relationship name (property) of the ontology schema, a mining pattern corresponding to the relationship name, and one or more RDF triples corresponding to the mining pattern, and connects and stores the mining rule in one format.

The step of recognizing a terminology from a text and converting the terminology into the mining pattern comprises the steps of: recognizing the terminology from the text using lexical analysis, syntactic analysis, and semantic analysis in association with the named entity dictionary and expressing the recognized terminology as a named entity corresponding to a terminology stored in the named entity dictionary; and converting the text including the named entity into a mining pattern.

According to still another aspect of the present invention, there is provided a recording medium that can be read by an electronic device, for recording a program for executing the mining rule database update method using a named entity dictionary and a mining rule combined with an ontology schema.

DETAILED DESCRIPTION

Figure 1:
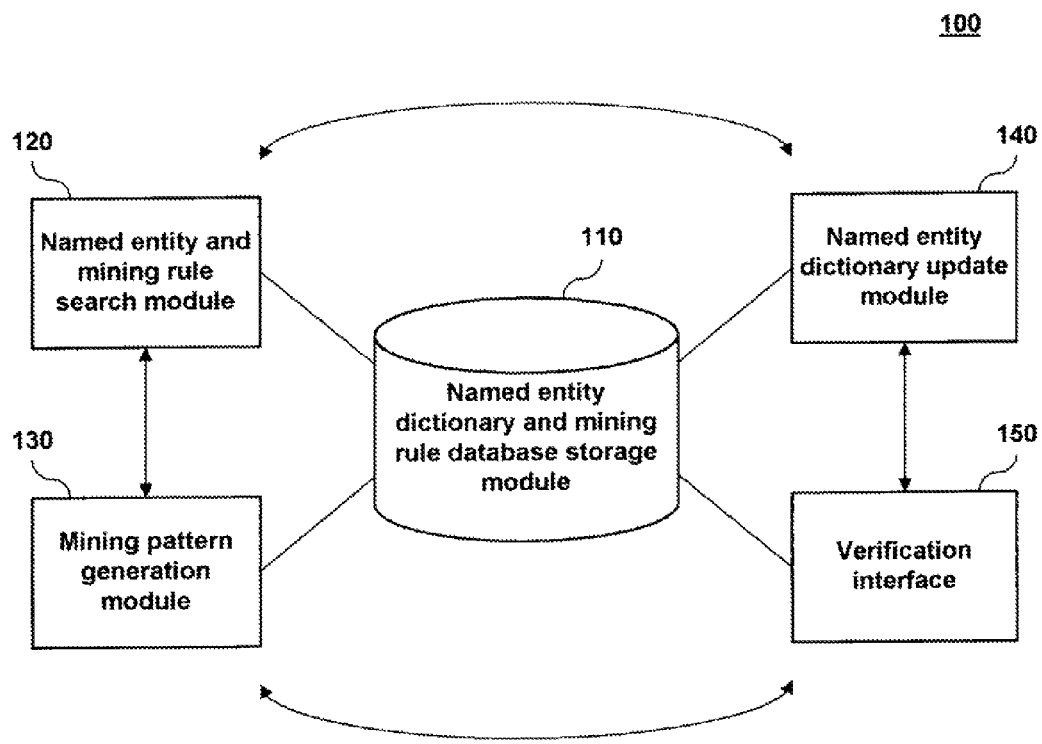
FIG. 1 a view showing an embodiment of a named entity dictionary update apparatus using a named entity dictionary and a mining rule combined with an ontology schema according to an aspect of the present invention.

The preferred embodiments of the present invention will be hereafter described in detail, with reference to the accompanying drawings. However, it should be understood that all the modifications, equivalents and substitutions are included within the scope of the invention defined by the claims.

Hereinafter, an apparatus and method for updating a named entity dictionary and an apparatus and method for updating a mining rule database using the named entity dictionary and a mining rule combined with an ontology schema, and a recording medium which can be read by an electronic device that has recorded the methods according to an embodiment of the present invention will be described in detail with reference to the drawings, and elements having like functions will be denoted by like reference numerals and details thereon will not be repeated.

Figure 8:
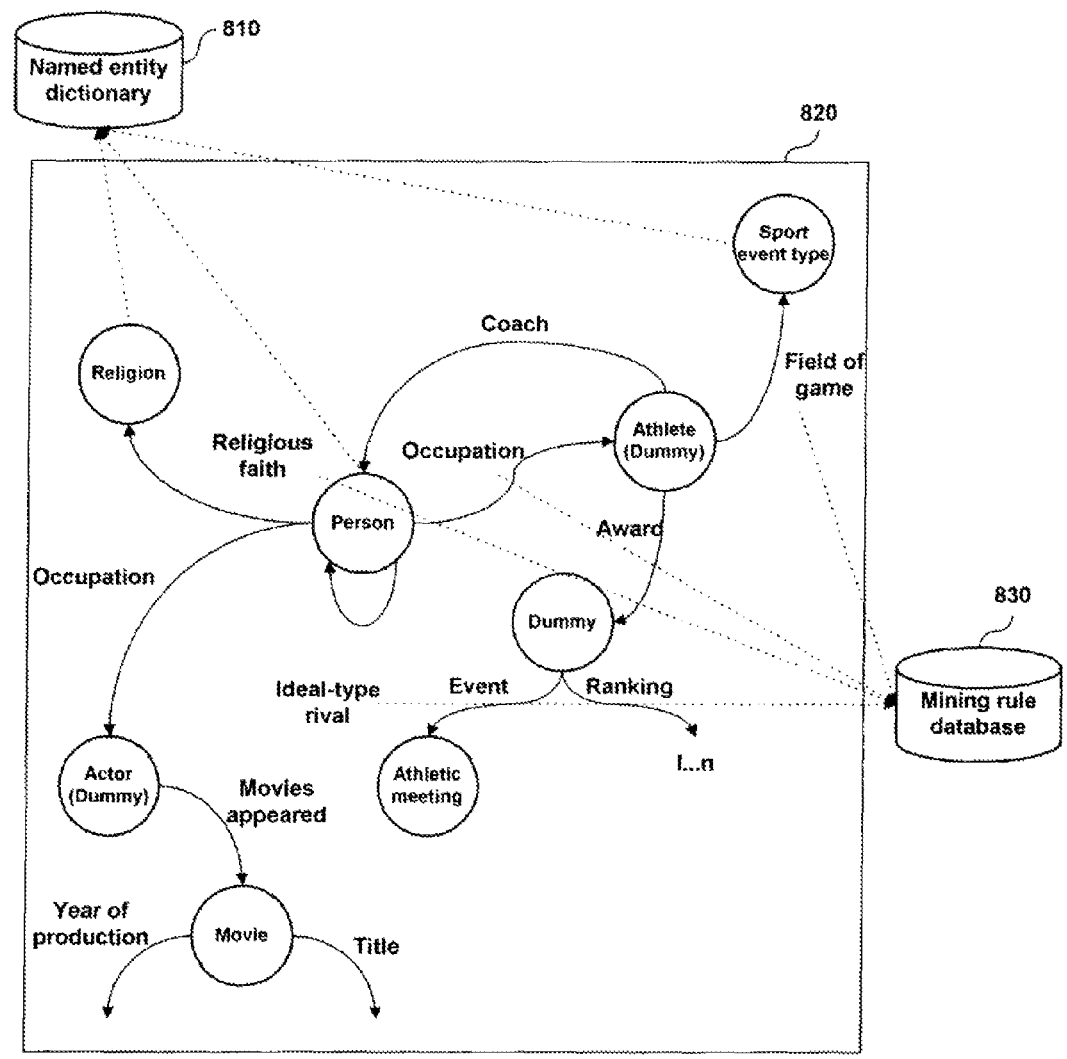
FIG. 8 is a conceptual view showing a connection relation between a named entity dictionary and a mining rule database combined with an ontology schema according to another aspect of the present invention.

FIG. 1 a view schematically showing an embodiment of a named entity dictionary update apparatus 100 using a named entity dictionary and a mining rule combined with an ontology schema according to an aspect of the present invention, and FIG. 8 is a conceptual view showing a connection relation between a named entity dictionary and a mining rule database combined with an ontology schema according to another aspect of the present invention.

According to an embodiment of the present invention, as shown in FIG. 1, the named entity dictionary update apparatus 100 using a named entity dictionary and a mining rule combined with an ontology schema comprises a named entity dictionary and mining rule database storage module 110, a mining pattern generation module 130, a named entity and mining rule search module 120, and a named entity dictionary update module 140.

In addition, the named entity dictionary update apparatus 100 using a named entity dictionary and a mining rule combined with an ontology schema may include a verification interface 150 for displaying an estimated named entity and a terminology in order to verify the estimated named entity by a user.

The named entity dictionary and mining rule database storage module 110 may store the named entity dictionary and the mining rule database.

As shown in FIG. 8, a named entity stored in the named entity dictionary and a mining rule of the mining rule database can be constructed in the form of a terminology connected to a concept (class) of an ontology schema, and a mining pattern and an RDF triple connected to a relationship name.

For example, a religion, a person, a sport event type, an the like, i.e., concepts (classes) of an ontology schema, are defined as a named entity, i.e., a key value of the named entity dictionary, and a specific instance can be defined as a terminology of the named entity dictionary.

In addition, an occupation, religious faith, a field of game, and the like, i.e., relationship names (properties) of an ontology schema, are defined as a relationship name, i.e., a key value of the mining rule database, and can be respectively connected to a mining pattern and an RDF triple corresponding to each relationship name.

Accordingly, the named entity dictionary and the mining rule database can be formed in association with the concept or the relationship name of the ontology schema.

The named entity dictionary is combined with the ontology schema, and a named entity of a terminology is defined therein. Authority data comprising a named entity corresponding to the concept (class) of the ontology schema, a terminology classified as the named entity, identification of the terminology, a representative terminology, and identification of the representative terminology is connected and stored in one format.

The mining rule database may store a mining rule configured with an RDF triple and a mining pattern combined with the ontology schema and corresponding to a relationship name.

The mining rule is defined to includes a relationship name (property) of the ontology schema, a mining pattern corresponding to the relationship name, and one or more RDF triples corresponding to the mining pattern, and the mining rule database can connect and store the relationship name (property) of the ontology schema, the mining pattern, and the RDF triple in one format.

In addition, according to another embodiment of the present invention, the named entity dictionary update apparatus using a named entity dictionary and a mining rule combined with the ontology schema may omit the mining pattern generation module and include a named entity dictionary and mining rule database storage module, a named entity and mining rule search module, and a named entity dictionary update module.

That is, if a mining pattern is directly inputted into the named entity and mining rule search module, functions of the mining pattern generation module are not needed, and thus the mining pattern generation module can be omitted.

Figure 3:
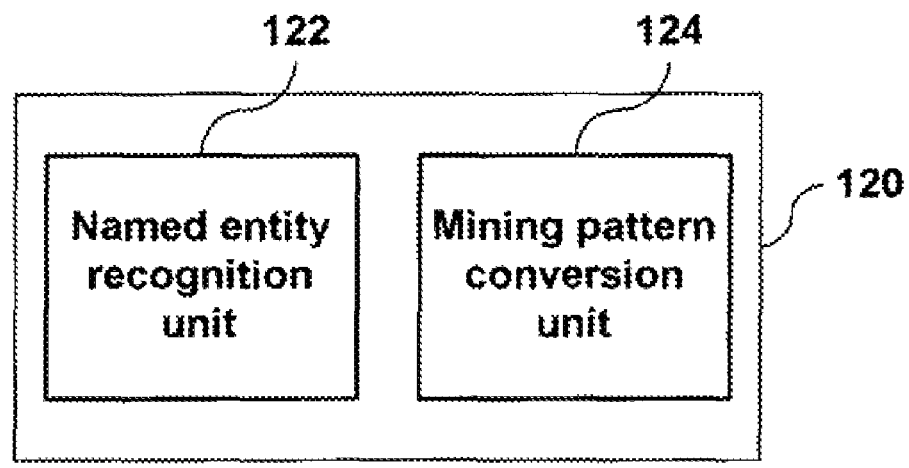
FIG. 3 is a view showing an embodiment of a mining pattern generation module of a named entity dictionary update apparatus or a mining rule database update apparatus using a named entity dictionary and a mining rule combined with an ontology schema according to an aspect of the present invention.
Figure 4:
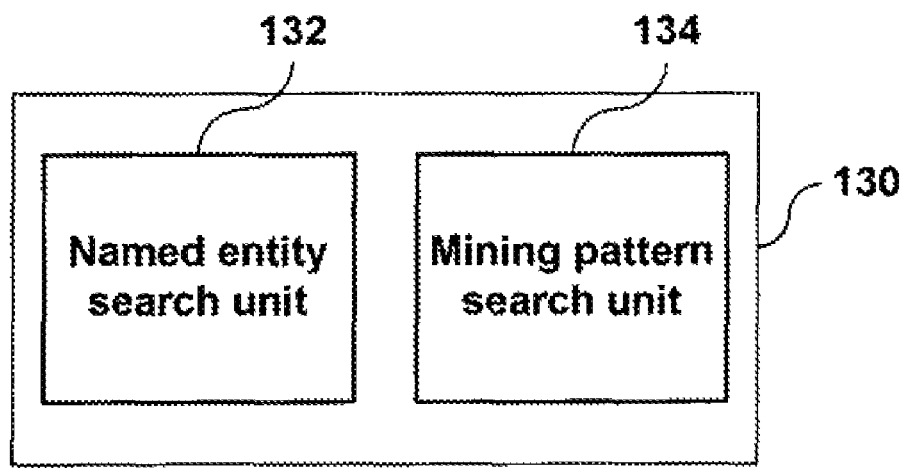
FIG. 4 is a view showing an embodiment of a named entity and mining rule search module of a named entity dictionary update apparatus or a mining rule database update apparatus using a named entity dictionary and a mining rule combined with an ontology schema according to an aspect of the present invention.
Figure 5:
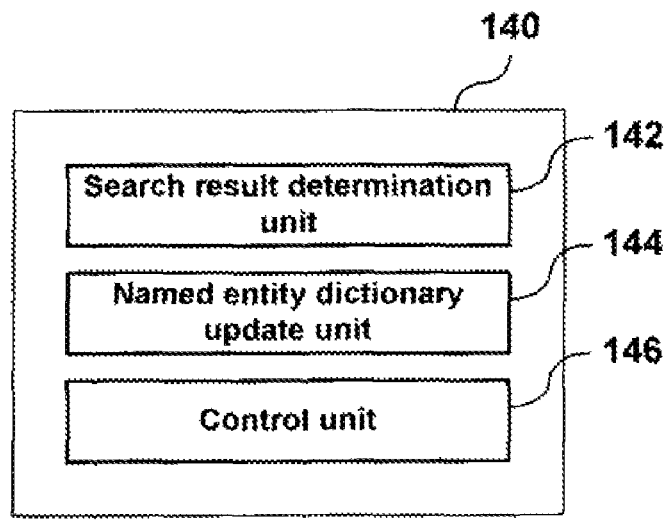
FIG. 5 is a view showing an embodiment of a named entity dictionary update module of a named entity dictionary update apparatus using a named entity dictionary and a mining rule combined with an ontology schema according to an aspect of the present invention.

FIG. 3 is a view showing an embodiment of a mining pattern generation module of a named entity dictionary update apparatus or a mining rule database update apparatus using a named entity dictionary and a mining rule combined with an ontology schema according to an aspect of the present invention, and FIG. 4 is a view showing the configuration of a named entity and mining rule search module of the present invention. FIG. 5 is a view schematically showing an embodiment of a named entity dictionary update module of the present invention.

According to an embodiment of the present invention, as shown in FIG. 3, the mining pattern generation module 130 recognizes a terminology from a text and converts the recognized terminology into a mining pattern, and may include a named entity recognition unit 122 and a mining pattern conversion unit 124.

The named entity recognition unit 122 may recognize a terminology from a text using lexical analysis, syntactic analysis, and semantic analysis in association with the named entity dictionary and express the recognized terminology as a named entity corresponding to a terminology stored in the named entity dictionary.

The mining pattern conversion unit 124 converts a text displayed including a named entity into a mining pattern.

According to an embodiment of the present invention, as shown in FIG. 4, the named entity and mining rule search module 120 may include a named entity search unit 132, and a mining rule search unit 134.

That is, the named entity search unit 132 may search for a named entity of the recognized terminology from the named entity dictionary, and the mining rule search unit 134 may search for a mining rule corresponding to the mining pattern from the mining rule database.

If a named entity corresponding to the recognized terminology is not searched from the named entity dictionary and a mining rule corresponding to the mining pattern is searched from the mining rule database, the named entity dictionary update module 140 estimates a named entity of the terminology using the mining rule and stores the estimated named entity of the terminology in the named entity dictionary depending on a user's selection.

The user may determine whether or not the terminology, the estimated named entity, and the property of the estimated named entity displayed on the verification interface 150 are appropriate and determine whether or not to store the estimated named entity in the named entity dictionary.

The named entity dictionary update module 140 may include a search result determination unit 142, a named entity dictionary update unit 144, and a control unit 146.

The search result determination unit 142 determines whether or not the recognized terminology is searched from the named entity dictionary by confirming a search result of the named entity search unit, and if the terminology is not searched from the named entity dictionary and the mining pattern is searched from the mining rule database as a result of the determination of the search result determination unit 142, the named entity dictionary update unit 144 may estimate a named entity of the terminology using the mining rule and store the estimated named entity and the terminology in the named entity dictionary depending on a user's selection.

The control unit 146 may control the search result determination unit 142 and the named entity dictionary update unit 144 to define and store properties of the named entity in the named entity dictionary update unit 144 depending on a result of the determination of the search result determination unit 142.

Particularly, the named entity dictionary update unit 144 may define properties of the named entity to include authority data comprising a named entity corresponding to the concept (class) of the ontology schema, a terminology classified as the named entity, identification of the terminology, a representative terminology, and identification of the representative terminology, and connect and store the properties of the named entity in one format.

For example, if a sentence saying that "It is said that Yuna Kim said Johnny Weir is her ideal type." is inputted, the mining pattern generation module recognizes terminologies such as 'Yuna Kim', 'Johnny Weir', and the like and converts terminologies into a mining pattern.

In the case where a named entity of 'Yuna Kim' is searched as '[person]' and a named entity of 'Johnny Weir' is not searched when 'Yuna Kim' and 'Johnny Weir', i.e., the recognized terminologies, are searched for from the named entity dictionary, if the sentence is converted into a mining pattern, the sentence can be converted into "% ideal_type of [person1] jcs [?] jco % self".

If a mining rule corresponding to a mining pattern matching to the converted mining pattern is searched for from the mining rule database, '% ideal_type of [person1] jcs [person2] jco % self'->'[person1]-ideal_type-[person2]' is searched, and a named entity of 'Johnny Weir' can be estimated as '[person]' from the searched mining rule.

As shown in Table 1, the named entity dictionary update module 140 may display terminologies, estimated named entities, identification, and the like on the verification interface 150 to be confirmed by the user.

TABLE 1

| Estimated named entity | Terminology | Identification | Confirmation |
| --- | --- | --- | --- |
| Person | Johnny Weir | http://ontoframe.kr/Person/0010 | ■ |
| Person | Johnny Walker | http://ontoframe.kr/Person/0011 | ☐ |

Figure 2:
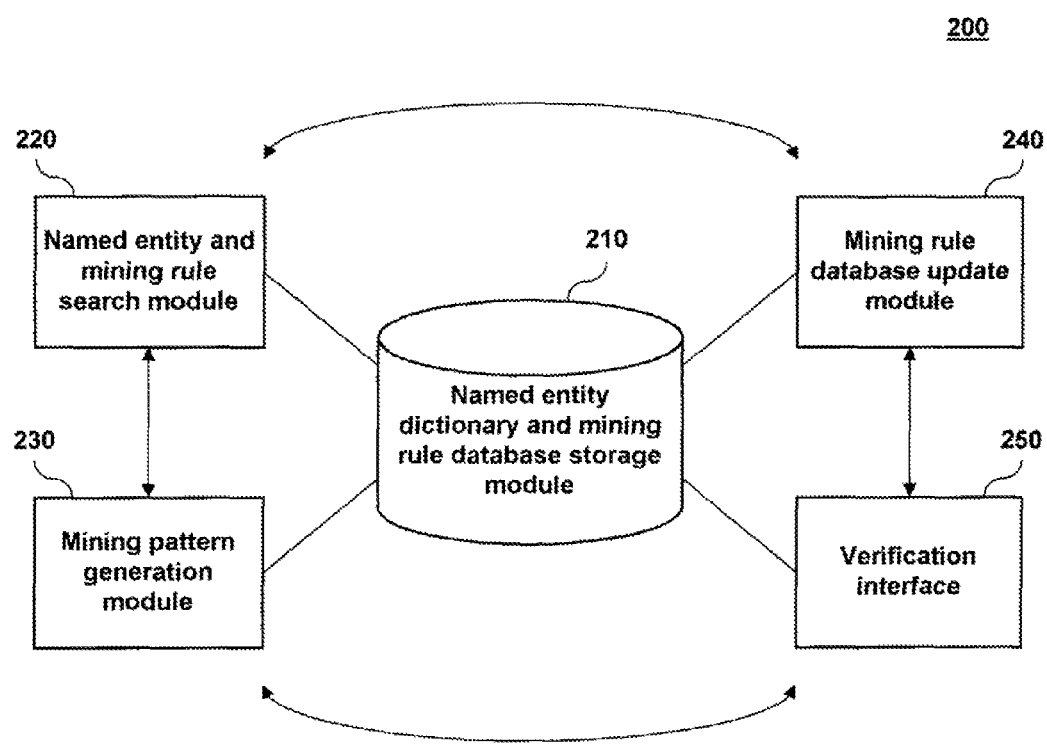
FIG. 2 is a view showing an embodiment of a mining rule database update apparatus using a named entity dictionary and a mining rule combined with an ontology schema according to an aspect of the present invention.

FIG. 2 is a view schematically showing an embodiment of a mining rule database update apparatus using a named entity dictionary and a mining rule combined with an ontology schema according to an aspect of the present invention.

According to an embodiment of the present invention, as shown in FIG. 2, the mining rule database update apparatus 200 using a named entity dictionary and a mining rule combined with an ontology schema may includes a named entity dictionary and mining rule database storage module 210, a mining pattern generation module 230, a named entity and mining rule search module 220, and a mining rule database update module 240.

The named entity dictionary and mining rule database storage module 210, the mining pattern generation module 230, and the named entity and mining rule search module 220 are the same as those in the configuration of the named entity dictionary update apparatus 100 using a named entity dictionary and a mining rule combined with an ontology schema and perform the same functions, and thus the configuration and functions of the mining rule database update module 240 will be mainly described.

Figure 6:
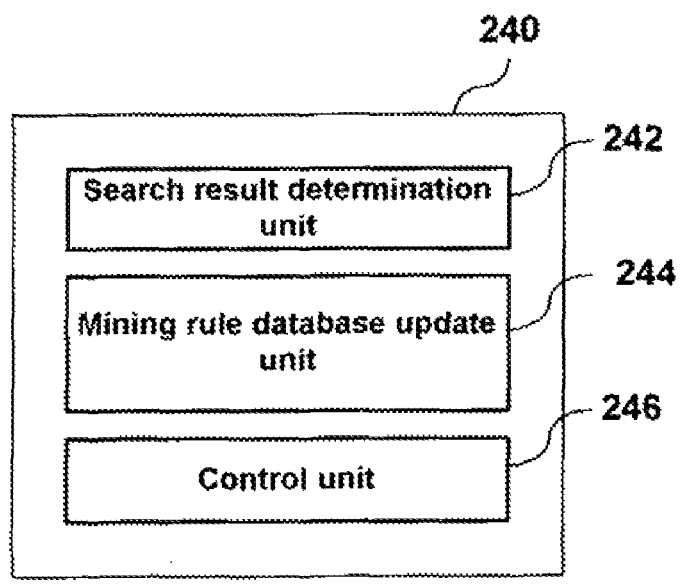
FIG. 6 is a view showing an embodiment of a mining rule database update module of a mining rule database update apparatus using a named entity dictionary and a mining rule combined with an ontology schema according to an aspect of the present invention.

FIG. 6 is a view schematically showing an embodiment of a mining rule database update module 240 of a mining rule database update apparatus 200 using a named entity dictionary and a mining rule combined with an ontology schema according to an aspect of the present invention.

According to an embodiment of the present invention, as shown in FIG. 6, the mining rule database update module 240 may include a search result determination unit 242, a mining rule database update unit 244, and a control unit 246.

The mining rule database update module 240 may estimate a relationship name using a named entity of a recognized terminology and the ontology schema, generate a corresponding mining rule, and then store the generated mining rule in the mining rule database depending on a user's selection.

In addition, the mining rule database update module 240 may be connected to a verification interface 250 for displaying a mining rule corresponding to a mining pattern.

The verification interface 250 may display an estimated relationship name, a mining patter, and a mining rule which can be stored in the mining rule database depending on user's confirmation.

The search result determination unit 242 of the mining rule database update module 240 may determine whether or not a mining pattern is searched from the mining rule database as a result of the search of the named entity and mining rule search module 220.

The mining rule database update unit 244 may update the mining rule database using a result of determining whether or not a mining pattern is searched from the mining rule database.

That is, if the mining pattern is not searched and the terminology is searched from the named entity dictionary, the mining rule database update unit 244 may estimate a relationship name using the searched named entity and the ontology schema, generate a mining rule corresponding to the relationship name, and then store the generated mining rule in the mining rule database depending on a user's selection.

The mining rule database update unit 244 may define a mining rule to include a relationship name (property) of the ontology schema, a mining pattern corresponding to the relationship name, and one or more RDF triples corresponding to the mining pattern, and connect and store the mining rule in one format.

The control unit 246 may control functions of the search result determination unit 242 and the mining rule database update unit 244 to define and store the mining rule in the mining rule database update unit 244 depending on a result of the determination of the search result determination unit 242.

In addition, according to another embodiment of the present invention, the mining rule database update apparatus using a named entity dictionary and a mining rule combined with an ontology schema may omit the mining pattern generation module, and include a named entity dictionary and mining rule database storage module, a named entity and mining rule search module, and a mining rule database update module.

That is, if a mining pattern is directly inputted into the named entity and mining rule search module, functions of the mining pattern generation module are not needed, and thus the mining pattern generation module can be omitted.

Figure 7:
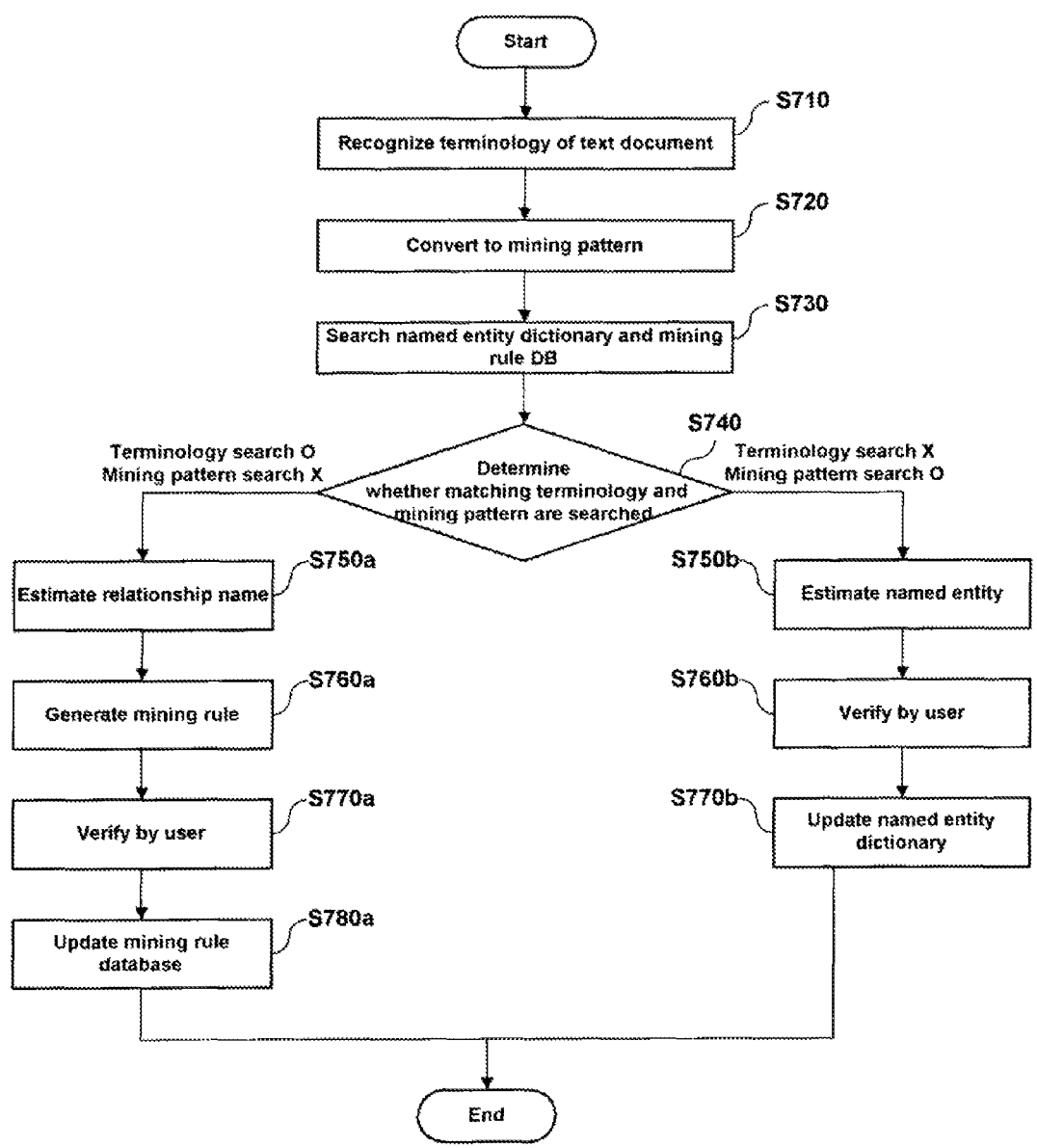
FIG. 7 is a flowchart illustrating an embodiment of a named entity dictionary update method or a mining rule database update method using a named entity dictionary and a mining rule combined with an ontology schema according to another aspect of the present invention.

FIG. 7 is a flowchart illustrating an embodiment of a named entity dictionary update method or a mining rule database update method using a named entity dictionary and a mining rule combined with an ontology schema according to another aspect of the present invention.

According to an embodiment of the present invention, as shown in FIG. 7, a named entity dictionary update method or a mining rule database update method using a named entity dictionary and a mining rule combined with an ontology may recognize a terminology in a text S710, convert the text into a mining pattern S720, and search for a terminology and a mining pattern from the named entity dictionary and the mining rule database S730.

As a result of the search, it is determined whether or not a terminology and a mining pattern matching to the searched terminology and mining pattern are searched S740, and the named entity dictionary and the mining rule database can be updated depending on a result of the determination.

If the terminology is searched from the named entity dictionary and the mining pattern is not searched from the mining rule database as a result of the determination, a relationship name of the terminology is estimated using the named entity S750a, and a mining rule corresponding to the relationship name is generated S760a. Then, a user verifies the terminology and the estimated named entity S770a, and the mining rule database can be updated by storing the mining rule in the mining rule database S780a.

If the terminology is not searched from the named entity dictionary and the mining pattern is searched from the mining rule database as a result of the determination, a named entity is estimated using a mining rule corresponding to the mining pattern S750b, and a user verifies the terminology and the estimated named entity S760b. The, the named entity dictionary can be updated by storing the named entity in the named entity dictionary S770b.

Accordingly, in the case where new terminologies are appeared, or terminologies used in the past become obsolete, or a new relation system needs to be specified among concepts, the named entity dictionary or the mining rule database can be updated.

According to another aspect of the present invention, a program for executing the mining rule database update method using a named entity dictionary and a mining rule combined with an ontology schema can be recorded in a recording medium that can be read by an electronic device.

The mining rule database update method using a named entity dictionary and a mining rule combined with an ontology schema can be implemented in a computer program, and computer programmers in the art can easily contrive codes and code segments configuring the program.

In addition, the mining rule database update method using a named entity dictionary and a mining rule combined with an ontology schema can be stored in an information storage medium (a computer readable medium) that can be read by a computer, and the named entity dictionary or the mining rule database can be updated by reading and executing the method using the computer.

According to the present invention, linguistic resources can be managed in an integrated manner by associating a named entity dictionary and a mining rule with an otology schema.

Furthermore, the named entity dictionary or the mining rule database can be expanded by estimating a mining rule that is not stored in the mining rule database using the named entity dictionary associated with the ontology schema and estimating a named entity using the mining rule database associated with the ontology schema While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A mining rule database update apparatus using a named entity dictionary and a mining rule combined with an ontology schema, the apparatus comprising:

a named entity dictionary and mining rule database storage module for storing the named entity dictionary where a named entity of a terminology combined with the ontology schema and connected to a concept (class) is defined and a mining rule database where the mining rule configured with an RDF triple and a mining pattern combined with the ontology schema and connected to a relationship name is defined;

a named entity and mining rule search module for searching for a corresponding mining rule and a named entity from the mining rule database and the named entity dictionary using a terminology included in an inputted mining pattern and the mining pattern; and a mining rule database update module for estimating a relationship name using a named entity of the terminology and the ontology schema, generating a corresponding mining rule, and then storing the generated mining rule in the mining rule database depending on a user's selection, if a mining rule corresponding to the mining pattern is not searched from the mining rule database and the named entity corresponding to the terminology is searched from the named entity.

2. The apparatus according to claim 1, wherein the mining rule database update module is connected to a verification interface for displaying a mining rule corresponding to the mining pattern, confirms the mining rule corresponding to the mining pattern by a user through the verification interface, and then stores a result of the confirmation in the mining rule database.

3. The apparatus according to claim 1, wherein the named entity and mining rule search module includes:

a named entity search unit for searching for the named entity of the terminology from the named entity dictionary; and a mining rule search unit for searching for the mining rule corresponding to the mining pattern from the mining rule database.

4. The apparatus according to claim 1, wherein the mining rule database update module includes:

a search result determination unit for determining whether or not the mining pattern is searched from the mining rule database as a result of the search;

a mining rule database update unit for estimating a relationship name using the searched named entity and the ontology schema, generating a mining rule corresponding to the relationship name, and then storing the generated mining rule in the mining rule database depending on a user's selection, if the mining pattern is not searched and the terminology is searched from the named entity dictionary as a result of the determination; and a control unit for controlling the mining rule database update unit to define and store the mining rule depending on a result of the determination of the search result determination unit.

5. The apparatus according to claim 4, wherein the mining rule database update unit defines the mining rule to include a relationship name (property) of the ontology schema, a mining pattern corresponding to the relationship name, and one or more RDF triples corresponding to the mining pattern, and connects and stores the mining rule in one format.

6. A named entity dictionary update method using a named entity dictionary and a mining rule combined with an ontology schema, in an apparatus comprising a storage module for storing a named entity dictionary where a named entity of a terminology combined with the stored ontology schema and connected to a concept (class) is defined and a mining rule database where a mining rule configured with an RDF triple and a mining pattern combined with the ontology schema and connected to a relationship name is defined, a mining pattern generation module, a named entity and mining rule search module, and a named entity dictionary update module, the method comprising the steps of:

recognizing a terminology from a text and converting the terminology into the mining pattern, by the mining pattern generation module;

searching for a corresponding named entity and a mining rule from the named entity dictionary and the mining rule database using the recognized terminology and the mining pattern, by the named entity and mining rule search module;

determining whether or not a terminology or a mining pattern corresponding to the recognized terminology or the mining pattern is searched from a result of the search, by the mining rule database update module;

if a matching terminology is searched from the named entity dictionary and a matching mining pattern is not searched from the mining rule database as a result of the determination, estimating a relationship name using the named entity of the terminology and the ontology schema and generating a corresponding mining rule, by the mining rule database update module; and storing the estimated relationship name and the mining rule in the mining rule database depending on a user's selection, by the mining rule database update module.

7. The method according to claim 6, wherein in the step of storing the estimated relationship name and the mining rule in the mining rule database depending on a user's selection, the estimated relationship name, the mining pattern, and the mining rule are displayed on a verification interface and verified by a user.

8. The method according to claim 6, wherein the mining rule database defines a mining rule to include a relationship name (property) of the ontology schema, a mining pattern corresponding to the relationship name, and one or more RDF triples corresponding to the mining pattern, and connects and stores the mining rule in one format.

9. The method according to claim 6, wherein the step of recognizing a terminology from a text and converting the terminology into the mining pattern comprises the steps of:

recognizing the terminology from the text using lexical analysis, syntactic analysis, and semantic analysis in association with the named entity dictionary and expressing the recognized terminology as a named entity corresponding to a terminology stored in the named entity dictionary; and converting the text including the named entity into a mining pattern.

10. A recording medium that can be read by an electronic device according to claim 6, for recording a program for executing the mining rule database update method using a named entity dictionary and a mining rule combined with an ontology schema.

* * * * *